US012333335B2

(12) United States Patent
Starr et al.

(10) Patent No.: US 12,333,335 B2
(45) Date of Patent: *Jun. 17, 2025

(54) INTENT-BASED ORCHESTRATION OF INDEPENDENT AUTOMATIONS

(71) Applicant: Fortinet, Inc., Sunnyvale, CA (US)

(72) Inventors: Michael C. Starr, Reston, VA (US); John T. Kamenik, York, PA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,345

(22) Filed: Nov. 30, 2023

(65) Prior Publication Data

US 2024/0103911 A1 Mar. 28, 2024

Related U.S. Application Data

(63) Continuation of application No. 17/175,524, filed on Feb. 12, 2021, now Pat. No. 11,928,499.

(51) Int. Cl.
 *G06F 9/48* (2006.01)
 *G06F 16/28* (2019.01)
(52) U.S. Cl.
 CPC ......... *G06F 9/4881* (2013.01); *G06F 16/285* (2019.01)

(58) Field of Classification Search
 CPC ............................ G06F 9/4881; G06F 16/285
 See application file for complete search history.

(56) References Cited

U.S. PATENT DOCUMENTS

| 2003/0059004 | A1* | 3/2003 | Jiang | H04M 3/533 |
| | | | | 707/999.104 |
| 2021/0112078 | A1* | 4/2021 | Huston, III | H04L 63/04 |
| 2022/0027137 | A1* | 1/2022 | Hoppe | G06F 8/60 |

* cited by examiner

*Primary Examiner* — Wissam Rashid
(74) *Attorney, Agent, or Firm* — Jaffery Watson Hamilton & DeSanctis LLP

(57) ABSTRACT

Systems and methods for intent-based orchestration of independent automations are provided. Examples described herein alleviate the complexities and technical challenges associated with deploying, provisioning, configuring, and managing configurable endpoints, including network devices, network security systems, cloud-based security services (e.g., provided by or representing a Secure Access Service Edge (SASE) platform), and other infrastructure, on behalf of numerous customers (or tenants). For example, customer intent may be automatically translated into concrete jobs and tasks that operate to make changes to one or more of the configurable endpoints so as to insulate the user from being required to know which configurable endpoint(s) need(s) to change, which vendor supports a given configurable endpoint, and/or vendor specific issues involved in changing the configurable endpoints.

20 Claims, 8 Drawing Sheets

600

```
# All documents must have a Version and Type.
type: "webserver"
version: "v1"

# The metadata is generic to all types and is a dictionary of common
# items.
metadata:
 uuid: "foo"
 changeSource: "https://portal.opaq.com/changesource"
 createdAt: "2019-01-01T15:43:12.000Z"

# Optionally, don't enqueue until after a specific date
 notBefore: "2020-01-01T15:43:12.000Z"

# Must be boolean, and if true the status is based on checking if
 # change could be run, (i.e., a dry run).
 validateOnly: true spec is defined by the type, and detailed on the Change Type page
spec:
 text: "Hello"

# Status is not writable directly, but is added via status update
# API.  They are provided here, because they will be provided when
# the change is queried.
status:
  # See: Change Status Codes page for details
  statusCode: 102

# Time of last update
  updatedAt: "2020-01-01T15:44:00.000Z"

# See: Change Source API page for details on what this value is
  updatedBy: "concourse-prod-eu"
```

```
type: "eppConf"
version: "v1.0.0"

# Metadata is provided by the Change Source
metadata: {}

# Status is provided by the Change Source, and updated by Orchestration
status: {} spec:
  cuid: "cu000001"

protectEmailRegistration:
    # either this OR "emails", not both
    emailRef: https://exmaple.com/v1/data/66195D87-4800-4C72-9414-A1893AC500F5/emails emails:
      - {email: abc@xyz.com, present: true}
      - {email: abcde@xyz.com, present: true}
      - {email: ijk@xyz.com, present: false} protectURLExceptions:
    mainURL: standard either this OR "urls", not both
    URLRef: https://exmaple.com/v1/data/66195D87-4800-4C72-9414-A1893AC500F5/urls URLs:
      - {email: abc@xyz.com, delete: none, add: strict}
      - {email: abcde@xyz.com, delete: strict}
      - {email: ijk@xyz.com, add: none}
```

FIG. 6B

| CHANGE TYPE | CHANGE CLASS | | | |
|---|---|---|---|---|
| | JOB | LCM | CM | CCM |
| PROTECT_CCM | LDAP_PANW | CSA, SALT, TERRAFORM, ETC | | |
| | KVM_INIT_PROXMOX | | ANSIBLE, TERRAFORM | |
| | PROC_RESTART_LINUX | | | SALT, TERRAFORM |
| CHANGETYPEN | JOBN | AE1, AEN | | |

INTENT-BASED ORCHESTRATION OF INDEPENDENT AUTOMATIONS

CROSS-REFERENCE TO RELATED APPLICATIONS

This application is a continuation of U.S. patent application Ser. No. 17/175,524, filed on Feb. 12, 2021, which is hereby incorporated by reference in its entirety for all purposes.

BACKGROUND

Field

Embodiments of the present invention generally relate to a cloud-based platform for the management of network and network security.

Description of the Related Art

Secure Access Service Edge (SASE) represents the convergence of network services and security policy near or at the point of access (whether in the cloud or as part of a software-defined network). SASE platforms provide a web interface (or portal) through which users of the platform are presented with an abstracted set of security and network controls. While this abstraction simplifies user interactions, it pushes the complexities of coordination and provisioning of many technologies across many device and infrastructure vendors distributed across many locations onto the SASE platform.

SUMMARY

Embodiments of the present invention generally relate to a cloud-based platform for the management of network operation and network security.

According to one embodiment, an orchestration and automation (O&A) platform that facilitates deployment, provisioning, configuration, and management of multiple of configurable endpoints, retrieves a change request from a remote work queue. The change request includes an expression of a change desired by a change source and is not specific to any particular configurable endpoint of the configurable endpoints. At least one of the configurable endpoints comprises a Secure Access Service Edge (SASE) platform. The O&A platform categorizes the change request into a particular change class of multiple change classes, in which the particular change class indicates one or more jobs to be performed to effectuate the change request. At least one automation engine is assigned to perform one or more tasks to complete the one or more jobs, in which the one or more tasks are specific to one or more configurable endpoints of the configurable endpoints. The one or more task are then performed to modify the one or more configurable endpoints consistent with the change request.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 6A is an example of change anatomy that is used in accordance with one or more embodiments.

FIG. 6B is an example use case of change anatomy designed in accordance with some embodiments.

DETAILED DESCRIPTION

Figure 1:
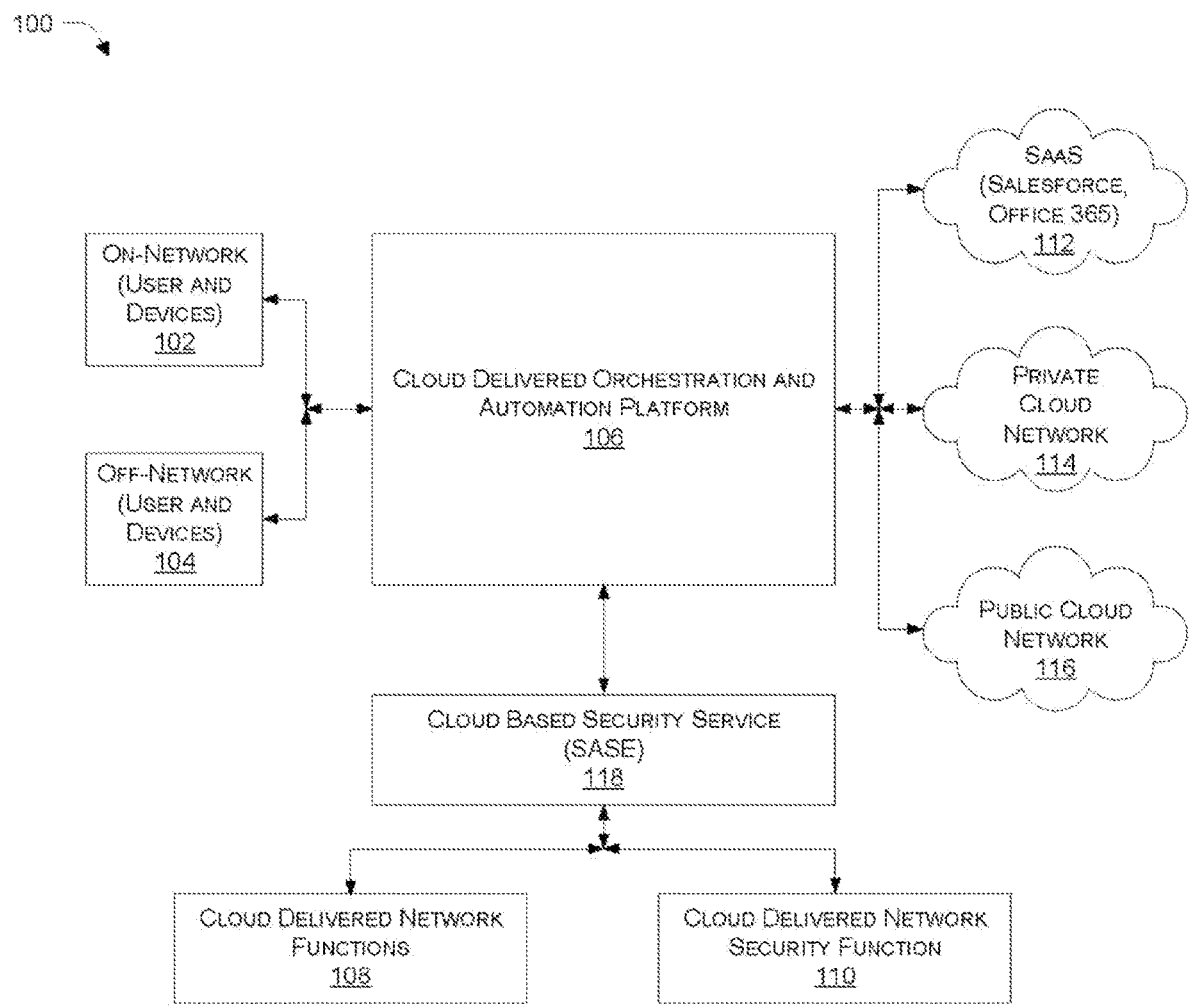
FIG. 1 shows an enterprise network in which a cloud-delivered orchestration and automation (O&A) platform operates in accordance with some embodiments.

Various systems and methods are described for vendor-agnostic, intent-based, orchestration of automation. The complexities and technical challenges associated with deploying, provisioning, configuring, and managing network devices, network security systems, and other infrastructure (e.g., servers for computing and storage) on behalf of numerous customers (or tenants) has become increasingly complicated as the number, type, and versions of such systems grow. This complexity is compounded by untrained customers attempting to maintain network configurations and assets without engaging trained personnel. Some of the systems and methods described herein alleviate the complexity by automatically translating customer intent into concrete jobs and tasks that operate the make changes to endpoints within the network. In this way, the user does not have to be informed about which endpoints need to change, which vendor supports a given endpoint, and/or vendor specific issues for changing the configurable endpoints.

As used herein, an "intent" generally refers to an overall desired outcome. Conveying intent is a simplified way of communicating a desired outcome to an orchestration and automation (O&A) platform, and in turn the O&A platform translates the intent into a myriad of operations (jobs and then tasks) that effectuate the overall outcome corresponding to the intent. In such a way, a simple expression of intent can be converted into a number of changes across a number of network devices and/or software applications where such network devices and software applications are provided from different vendors and/or each have several versions. In effect, the O&A platform maintains a knowledge of what is required to implement a given intent, and upon receiving a change request that is ignorant of all of the changes required to implement the intent of the change request, the O&A platform translates the intent into hardware and software application changes specific to the hardware and software applications used in the particular scenario to effectuate the intent. As just one example, the intent of a change request is to limit a particular user's access to a class of web sites. As another example, the intent of a change request is to implement a desired security protocol for a given business. As yet another example, the intent may be to purchase a number of public IP addresses when a resource is identified as running low. Based upon the disclosure provided herein, one of ordinary skill in the art will recognize a variety of intents that may be implemented using embodiments disclosed herein.

As just one application example, an automated change source (e.g., enterprise resource planning module) may monitor the number of public IP addresses available. Where the number of public IP addresses available drops below a defined threshold, the automated change source publishes a change request to a remote work queue associated with the change source. The change request indicates a need to obtain additional public IP addresses. This change request is categorized into a particular change class that includes, for example, a first job to request permission from a user to purchase additional public IP addresses, a second job to purchase additional IP addresses, and a third job to make the additional public IP addresses accessible in the system. The first job may be assigned to a first automation engine that emails the permission request to a designated recipient and awaits a response. The second job may be dependent upon completion of the first job, and is assigned to a second automation engine that issues a purchase request for the public IP addresses to a source of public IP addresses and awaits completion of the purchase request. The third job may be dependent upon completion of the second job, and is assigned to a third automation engine that makes any received public IP addresses visible in the system. An O&A engine assures that the first job, second job, and third job are performed in their proper order. All of the aforementioned processing can be done for the automated change source that is ignorant of who must be asked for permission to obtain additional public IP addresses, who sells public IP addresses, and what it takes to receive additional public IP addresses and make them visible in the system.

As another application example, a law firm with a home office in New York City may open an office in Los Angeles. A user would issue a change request asking that the security protocol used by the firm be implemented for network access in Los Angeles. In turn, an O&A system in accordance with some embodiments discussed herein would retrieve that change request, and categorize the change request into a change class for changes requiring similar resources and/or actions. One or more jobs designed to perform tasks to complete an action corresponding to the change class are then performed on the particular endpoint. In making the transformation from the change request, the O&A system identifies vendor specific hardware to be changed and performs the identified jobs in compliance with the vendor specific hardware. As such, the user publishing the change request does not need to be an expert on which tasks are required to perform the desired change or even what hardware or software applications need to be changed to effect the change request.

As yet another application example, the same user at the law firm may request that all law firm employees be granted access in Los Angeles that is similar to that in New York City. Again, the change request is retrieved and processed causing a variety of changes to hardware and/or software applications without require the user publishing the change request to be an expert on which tasks are required to perform the desired change or even what hardware or software applications need to be changed to effect the change request. The aforementioned applications are merely examples, and based upon the disclosure provided herein, one of ordinary skill in the art will recognize a myriad of applications that are possible using one or more embodiments discussed herein.

Various embodiments provide methods for orchestrating user intent in a network environment. Such methods include retrieving a change request, by an orchestration and automation (O&A) module, from a remote work queue. The change request includes an expression of a change desired by a change source, and is not specific to any particular configurable endpoint. The methods further include categorizing, by the O&A module, the change request into a particular change class. The particular change class is one of a plurality of change classes, and the particular change class indicates one or more jobs to be performed to effectuate the change request. The methods further include: assigning at least one automation engine to perform one or more tasks to complete the one or more jobs, where the one or more tasks are specific to one or more configurable endpoints; and performing the one or more tasks to modify the one or more configurable endpoints consistent with the change request. In some instances of the aforementioned embodiments, the methods further include: receiving information regarding a completion status of the one or more jobs; and reporting a completion status of the change request to the change source.

In some instances of the aforementioned embodiments, the at least one automation engine includes a first automation engine and a second automation engine, the one or more configurable endpoints includes a first configurable endpoint and a second configurable endpoint, the two or more jobs includes a first job and a second job, the one or more tasks includes a first task associated with the first job and a second task associated with the second job, and performing the one or more tasks to modify the one or more configurable endpoints includes: determining a prerequisite for completing the first job and the second job, and orchestrating performance of the first job and the second job based at least in part on the prerequisite. Such orchestrating includes: when the prerequisite is capable of being satisfied: causing the first automation engine to execute the first task to configure the first configurable endpoint; and causing the second automation engine to execute the second task to configure the second configurable endpoint.

In various cases of the aforementioned instances, the orchestrating includes scheduling the first job and the second job to be performed serially. In other cases of the aforementioned instances, the orchestrating includes scheduling the first job and the second job to be performed in parallel. In some cases of the aforementioned instances, the methods further include: when the prerequisite is incapable of being satisfied, identifying an automated solution to cure a defect in one or more of the first job, the second job, the first endpoint, or the second endpoint and re-determining the prerequisite for completing the first job and the second job.

In some instances of the aforementioned embodiments, the one or more configurable endpoints includes a first configurable endpoint and a second configurable endpoint, the two or more jobs includes a first job and a second job, and the one or more tasks includes a first task and a second task associated with the first job, and a third task and a fourth task associated with the second job. In such instances, the methods further include: dynamically translating the first job into at least the first task and the second task, where at least one of the first task and the second task is a configuration command to be issued to the first configurable endpoint; and dynamically translating the second job into at least the third task and the fourth task, where at least one of the third task and the fourth task is a configuration command to be issued to the second configurable endpoint.

In various instances of the aforementioned embodiments, the change request includes an appended data element. In such instances, categorizing the change request into the particular change class may be based at least in part on the appended data element. The appended data element is automatically associated with the change request without input from the change source. In some cases, the appended data element includes metadata and configuration data. In some instances of the aforementioned embodiments, the change source is one of a human user, an alert generating system, a system generated interrupt, or an enterprise resource planning system. In some instances of the aforementioned embodiments, the change source is one of a plurality of change sources, the remote work queue is one of a plurality of remote work queues. In such instances, each of the plurality of remote work queues may be associated with a respective one of the plurality of change sources, and the retrieving includes checking each of the plurality of remote work queues. In one or more instances of the aforementioned embodiments, at least one of the one or more configurable endpoints is a network device, a network security device, or a cloud based service.

Other embodiments provide a network system having at least one processor and a memory. The memory includes instructions executable by at least one processor to: retrieve a change request from a remote work queue, where the change request includes an expression of a change desired by a change source, and where the change request is not specific to any particular configurable endpoint; categorize the change request into a particular change class, where the particular change class is one of a plurality of change classes, and where the particular change class indicates one or more jobs to be performed to effectuate the change request; assign at least one automation engine to perform one or more tasks to complete the one or more jobs, where the one or more tasks are specific to one or more configurable endpoints; and perform the one or more tasks to modify the one or more configurable endpoints consistent with the change request.

Other embodiments provide a non-transitory computer-readable storage medium embodying a set of instructions, which when executed by one or more processing resources of a computer system, causes the one or more processing resources to perform a method including retrieving a change request from a remote work queue. The change request includes an expression of a change desired by a change source, and is not specific to any particular configurable endpoint. The method further includes categorizing the change request into a particular change class. The particular change class is one of a plurality of change classes, and the particular change class indicates one or more jobs to be performed to effectuate the change request. The method further includes: assigning at least one automation engine to perform one or more tasks to complete the one or more jobs, where the one or more tasks are specific to one or more configurable endpoints; and performing the one or more tasks to modify the one or more configurable endpoints consistent with the change request. In some instances of the aforementioned embodiments, the methods further include: receiving information regarding a completion status of the one or more jobs; and reporting a completion status of the change request to the change source.

Some embodiments discussed herein include various processes that may be performed by hardware components or may be embodied in machine-executable instructions, which may be used to cause a general-purpose or special-purpose processor programmed with the instructions to perform the processes. Alternatively, processes may be performed by a combination of hardware, software, firmware, and/or by human operators. Thus, the functions of the various elements shown in the figures may be provided through the use of dedicated hardware and/or through hardware capable of executing associated software.

Various embodiments may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to some embodiments with appropriate standard computer hardware to execute the code contained therein. An apparatus for practicing various embodiments may involve one or more computers (or one or more processors within the single computer) and storage systems containing or having network access to a computer program(s) coded in accordance with various methods described herein, and the method processes of various embodiments may be accomplished by modules, routines, subroutines, or subparts of a computer program product.

In the following description, numerous specific details are set forth in order to provide a thorough understanding of example embodiments. It will be apparent, however, to one of ordinary skill in the art that embodiments described herein may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "change source" generally refers to a requestor (human or automated machine) that is capable of submitting or publishing a change request, including information regarding a change desired to be made that may impact one or more configurable endpoints associated with an O&A platform. Changes may be made, for example, with respect to a network device (e.g., configuration of a switch or a router), a virtual machine (VM) (e.g., deployment or configuration of a VM), or security policies (e.g., setting security policies). The information regarding a change request is a specific representation of the desired intent of the requestor and maybe in the form of a structured data (e.g., Extensible Markup Language (XML), JavaScript Object Notation (JSON), YAML Ain't Markup Language (YAML), or the like). Change sources may include humans, machines, and/or processes. Based upon the disclosure provided herein, one of ordinary skill in the art will recognize a variety of change sources that may be used in relation to various embodiments discussed herein.

As used herein, a "change class" generally refers to groupings of types of changes that have similar life cycles. Non-limiting examples of change classes include, but are not limited to, a Life Cycle Management (LCM) class, a Configuration Management (CM) class, and a Customer Configuration Management (CCM) class. The LCM class may include system changes (e.g., operating system upgrades to infrastructure associated with the O&A platform) having the potential to impact multiple customers of the O&A platform. The CM class may include system-specific configurations (e.g., initial provisioning of a Firewall as a Service (FWaaS) customer or adding a new virtual private network (VPN) server) having the potential to impact a single customer of the O&A platform. The CCM class may include customer-specific configurations (e.g., internal policy updates to their cloud firewall or endpoint control or changing Web Application Firewall (WAF) domain settings), the impact of which is limited to the customer at issue. Based upon the disclosure provided herein, one of ordinary skill in the art will recognize a variety of change classes that may be used in relation to various embodiments discussed herein.

As used herein, a "configurable endpoint" or just "endpoint" generally refers to any device or software application that is configurable by O&A platform whose configuration, state, and/or behavior can be changed by a change source. Non-limiting examples of configurable endpoints include, but are not limited to, infrastructure associated with the O&A platform, such as servers, network devices, network security appliances, VMs, network service, network security service, desk top computers, laptop computers, tablets, phones, and/or the cloud enabled services. Based upon the disclosure provided herein, one of ordinary skill in the art will recognize a variety of configurable endpoints that may be configured using embodiments discussed herein.

As used herein, a "job" generally refers to a request that is a group of one or more tasks that when performed together effectuate a specific intent. For example, creating an internal policy via a portal for a customer using FWaaS might have multiple jobs, and one of the jobs might be to create a security policy on a firewall. Doing this might require multiple tasks (e.g., a couple of discrete "set" commands) like giving the policy a name, setting the source/destination IP addresses, or applying advanced security profiles. Based upon the disclosure provided herein, one of ordinary skill in the art will recognize a variety of jobs that may be performed in relation to one or more embodiments to effectuate a specific intent.

As used herein, a "task" generally refers to a single interaction with a configurable endpoint that by itself has a specific intent. A non-limiting example of a task is a monitoring system requesting a process on a server be restarted because it received an alert. This same task may also be part of a job designed to update the configuration of that same process. Tasks may be referenced by many jobs but are not required to do so. Based upon the disclosure provided herein, one of ordinary skill in the art will recognize a variety of tasks that may be defined and used in relation to one or more embodiments to effectuate a desired result.

As used herein, the phrase "automation engine" is used in its broadest sense to mean any tool configured to achieve a specific intent. Thus, an automation engine may be an application such as, for example, saltstack, terraform, puppet, chef, or ansible that can be used to implement a specific intent. As a more particular example, a particular task may be done with the aforementioned terraform (e.g., a first automation engine) configured to spin up a new cloud resource (i.e., the specific intent of the task), and another task may be done with the aforementioned saltstack (e.g., a second automation engine) to maintain the life cycle configuration management of the resource previously spun up by terraform (i.e., the specific intent of the second task). Based upon the disclosure provided herein, one of ordinary skill in the art will recognize a variety of automation engines that may be used in relation to different embodiments.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides the one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Turning to FIG. 1, an enterprise network 100 in which a cloud-delivered O&A platform 106 operates is shown in accordance with some embodiments. Cloud-delivered O&A platform 106 is configured to provide vendor-agnostic, intent-based orchestration of independent automation to execute tasks on multiple configurable endpoints. O&A platform 106 facilitates deploying, provisioning, configuring, and managing network devices, network security systems, network resources, network infrastructures, and other such configurable endpoints developed by different vendors through a unified interface. O&A platform 106 may receive a change request through any component of a cloud-based security service 118 (e.g., SASE) and update computing resources associated with a cloud-based security service 118. O&A platform 106 provides users and devices located in a secure network (referred to as on-network 102) or located outside the protected network (referred to as off-network 104) to deploy, provision, configure and manage configurable endpoints. O&A platform 106 may facilitate the management of cloud-delivered network functions 108, cloud-delivered network security function 110, SaaS 112 services, devices and services located in the private cloud network 114, and devices and services located in the public cloud network 116.

O&A platform 106 may retrieve change requests from a change source, where the change request is a representation of an intent to perform a certain action(s) on one or more configurable endpoint devices located across different networks. Multiple change sources, such as devices or machines present in on-network 102 or off-network 104, may simultaneously connect to O&A platform 106 from a different location and submit change requests for several different configurable endpoint devices that may be located in different networks. Each change source associated with O&A platform 106 may be mapped to one or more remote work queues to which it may submit a change request. The change sources may include, but are not limited to, a user interacting with the O&A platform 106 or a machine or process generating alerts, instructions, or commands O&A platform 106 may retrieve a change request by querying different remote work queues. O&A platform 106 checks each of the plurality of remote work queues for the presence of one or more change requests and selects a change request that has not previously been claimed. In an embodiment, the remote work queues can also actively push change requests to O&A platform 106. As one may appreciate, O&A platform 106 may allow the addition of new remote work queue and configurable endpoints and/or removal thereof. For each additional change source that is associated with the O&A platform 106, a remote work queue can be assigned.

In an embodiment, O&A platform 106 categorizes the change request into a particular change class (i.e., one of a number of possible change classes), determines multiple jobs that are required to be completed to effectuate the change request, and assigns one or more automation engines to execute tasks associated with the aforementioned multiple jobs. O&A platform 106 determines the change type associated with the particular class. O&A platform 106 orchestrates the performance of one or more jobs based on the particular class in part by determining a prerequisite for completing one or more jobs. O&A platform 106 schedules jobs for execution in parallel, wherever possible, and in series, wherever required. While scheduling the jobs, the O&A platform 106 tries to minimize the overall time required to complete one or more jobs while ensuring minimal locking and disturbance to other resources and services.

As described above, on receipt of the change request, which may include multiple jobs and each of the multiple jobs may include multiple tasks, O&A platform 106 may determine how to get these tasks executed in the most efficient manner by parallel execution of an independent set of tasks and sequential execution of dependent tasks. O&A platform 106 may group tasks based on logical parameters and assign a group of tasks on one automation engine and the second group of tasks on the second automation engine and similarly another group of tasks on another automation engine. O&A platform 106 orchestrates these activities and oversee the execution by different automation engines. O&A platform 106 invokes automation engines (also referred to as tools) to complete the one or more jobs associated with the change request.

In an embodiment, O&A platform 106 may assign a group of tasks related to a particular job to a single automation engine. O&A platform 106 may assign one or more jobs to a single automation engine if the jobs are to be completed in a sequential manner. An orchestration of the O&A platform 106 oversees, the intent of a change is properly implemented across the disparate systems. O&A platform 106 dynamically translates intent into outcomes through processes describes above.

The O&A platform 106 retrieves change requests from remote work queues. As one may appreciate, the placement of remote work queues outside a protected network allows the platform to maintain isolation of resources publicly accessible from resources that interact directly with the secure infrastructure. O&A platform 106 performs change categorization and ensures that the required details are properly referenced from correct resources in the change request, performs appropriate resource locking based on the class of change, ensures that the jobs are in proper order or in parallel, and appropriate automation engines are invoked. O&A platform 106 groups changes, jobs, and tasks based on different logical parameters. In an embodiment, O&A platform 106 categorizes the change requests into different change classes based on logical parameters. For example, changes that have similar life cycles are categorized together as one change class, changes that require similar resource locking are categorized together as another change class, and changes that require similar configuration are categorized together as another change class. Other non-limiting examples of change classes include a Life Cycle Management (LCM) class, a Configuration Management (CM) class, and a Customer Configuration Management (CCM) class. The LCM class may include system changes (e.g., operating system upgrades to infrastructure associated with the O&A platform) having the potential to impact multiple customers of the O&A platform. The CM class may include system-specific configurations (e.g., initial provisioning of a Firewall as a Service (FWaaS) customer or adding a new virtual private network (VPN) server) having the potential to impact a single customer of the O&A platform. The CCM class may include customer-specific configurations (e.g., internal policy updates to their cloud firewall or endpoint control or changing Web Application Firewall (WAF) domain settings), the impact of which is limited to the customer at issue.

O&A platform 106 supports, at different layers, potential parallel and sequential execution of jobs. For executing change requests, O&A platform 106 may check all the jobs that can be parallelized or need to be serialized and schedule the jobs accordingly. For a more complex job, for example, setting up a firewall or service across multiple regions across the globe, the first thing that has to happen is creation of the virtual domain on certain locations. Jobs, such as creating the security policy, have to wait until virtual domains are created. The jobs related to security policy can be initiated only after virtual domains are created. However, the creation of multiple VR domains can happen in parallel to multiple regions. O&A platform 106 can intelligently determine an efficient schedule of initiating and executing different jobs in a parallel and serial manner. In the present example, platform 106 may monitor the creation of multiple virtual domains and may not wait for all virtual domains to be created before initiating the policy creation. O&A platform 106 may initiate the creation of a security interface, create a security policy, etc. for a virtual domain that is already created, while other jobs of the same category (creation of virtual domain) are still being performed. The O&A platform 106 may perform the scheduling with the objective of executing the required change in the minimum time possible, without disrupting other services, instructions, or resources for a longer time.

As one may appreciate, O&A platform 106 provides scalability to receive and execute change requests from any number of change sources and execute tasks on any number of configurable endpoint devices or services. O&A platform 106 provides a single language in which change requests can be submitted by different change sources. O&A platform 106 receives the changes request in a standardized language from different change sources and translates the changes requests into jobs or tasks that may be implemented in a language that is different from the aforementioned standardized language and that implement specific protocols of a targeted endpoint device.

Figure 2:
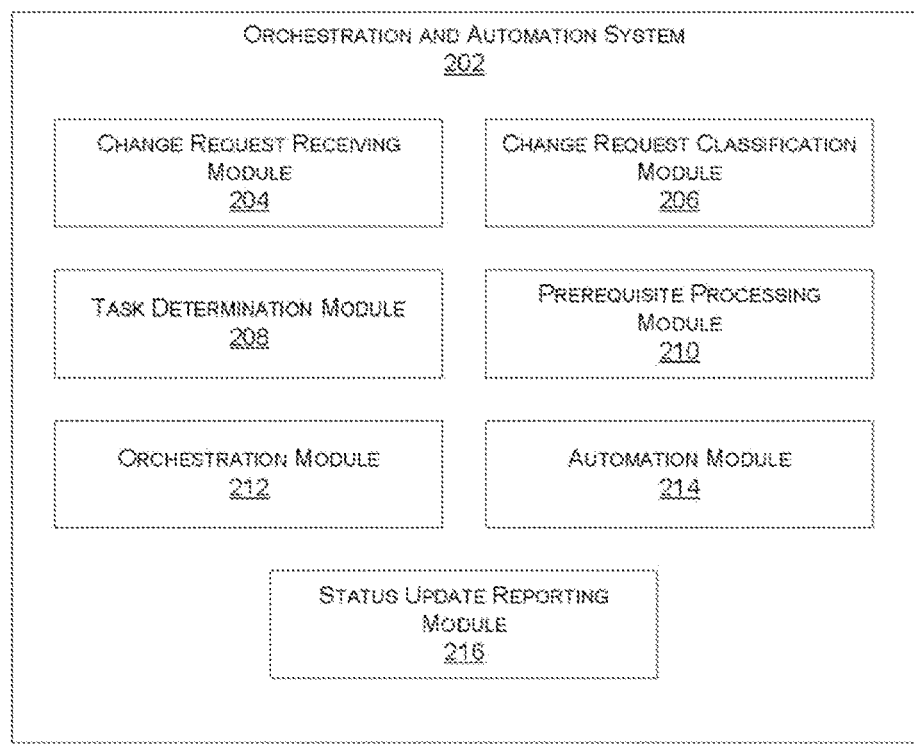
FIG. 2 depicts various functional modules of an O&A platform in accordance with various embodiments.

Turning to FIG. 2, various functional modules of an O&A system 202 are depicted in accordance with various embodiments. O&A system 202 is configured to retrieve a change request from a remote work queue, classify the change request, enhance the change requests, complete prerequisites, invoke automation engines, and orchestrate the execution of jobs at configurable endpoints. O&A system 202 is configured to implement features of O&A platform 106 in a centralized or cloud-based environment.

O&A system 202 includes a change request receiving module 204 configured to retrieve change requests from remote work queues each associated with respective change sources. Such change requests represent an intent of the change source regarding a change to be made on one or more configurable endpoints overseen by O&A system 202. Change request receiving module 204 may continuously check each remote work queue to determine the presence of an unclaimed change request (a change request that is not yet processing or has not yet been processed by O&A system 202) and retrieve an unclaimed change request from the remote work queue. In an embodiment, the remote work queues may be located in customer premises or in public networks in order to isolate other secure resources associated with O&A system 202. Change request receiving module 204 may perform a validity check and security check, in an isolated environment to determine that the change request is a valid change request and will not trigger any suspicious activity when associated jobs are executed on configurable endpoints. O&A system 202 may receive change requests in the form of change definition or functional parameters in a standardized language. O&A system 202 removes the burden from users or devices to know different languages used by configurable endpoints for receiving and sending instructions.

O&A system 202 includes a change request classification module 206 configured to categorize the change request into one of a number of change classes, and determine one or more jobs that need to be completed to fulfill a change request for the particular change class into which the change request was categorized. Change request classification module 206 may additionally enrich the jobs for the particular change class based upon metadata and configuration data included with the change request. Such enrichment may include modifications to jobs where the metadata and configuration data contained within the change request indicate differences from the standard jobs for the particular change class. As described above, a change request may be classified using different logical parameters, such as life cycle, nature of jobs, resource utilization, impacted endpoints, type of configurable devices, vendor details, etc. O&A system 202 may group tasks into different groups.

O&A system 202 includes a task determination module 208 configured to determine a set of tasks that need to be performed for each job of the multiple jobs associated with the change request, and a prerequisite processing module 210 configured to determine one or more prerequisites for completing all the tasks associated with multiple jobs and complete the prerequisites. The prerequisite processing module 210 determines one or more dependencies, resource locking requirements, collection of essential data points, certification, etc. that would be required for completing tasks. Prerequisite processing module 210 completes the prerequisites, if required, in a secured environment by interacting with different entities.

O&A system 202 includes an orchestration module 212 configured to determine resource and/or output dependencies of various jobs, determine efficient execution schedule for the jobs, determine sets of tasks to be executed in parallel, and tasks that are required to be performed in sequence. Orchestration module 212 works in coordination with automation module 214 to invoke one or more automation engines that can convert tasks received in a standardized language to configuration commands in the language native to configurable endpoints.

Automation module 214 is configured to invoke one or more automation engines and assign logically grouped tasks to the one or more automation engines. In an embodiment, automation module 214 assigns a first set of tasks to configure a first configurable endpoint associated with O&A system 202 to a first automation engine of a plurality of automation engines and a second set of tasks to configure a second configurable endpoint associated with O&A system 202 by invoking a second automation engine of the plurality of automation engines. Automation module 212 assigns tasks based on the determined change class to an automation engine that is configured to perform tasks related to the determined change class. In an embodiment, O&A system 202 may have multiple automation engines. In some cases, these automation engines are designed for configurable endpoints developed by a particular vendor. An automation engine can be designed for a particular type of job, and orchestration module 212 may assign the tasks related to the particular job to the job-specific automation engine. The automation engines perform dynamic translation of tasks into configuration commands to be executed on configurable endpoints. In an embodiment, a first automation engine performs a dynamic translation of the first set of tasks into configuration commands to be executed on a first configurable endpoint based on a first standardized templating function corresponding to a first vendor of the first configurable endpoint, and a second automation engine performs a dynamic translation of the second set of tasks into configuration commands to be executed on the second configurable endpoint based on a second standardized templating function corresponding to a second vendor of the second configurable endpoint. The automation engines may use a vendor-specific translator to convert tasks received in standardized language to vendor-specific language.

O&A system 202 oversees the execution of commands on the configurable endpoint. O&A system 202 further includes a status update reporting module 216 configured to collect status updates from configurable endpoints and report the same to the change sources from which the change request was received. Status reporting module 216 may also report the status of classification, prerequisite process, other orchestration processing, translation, and configuration changes on the configurable endpoints.

Figure 3:
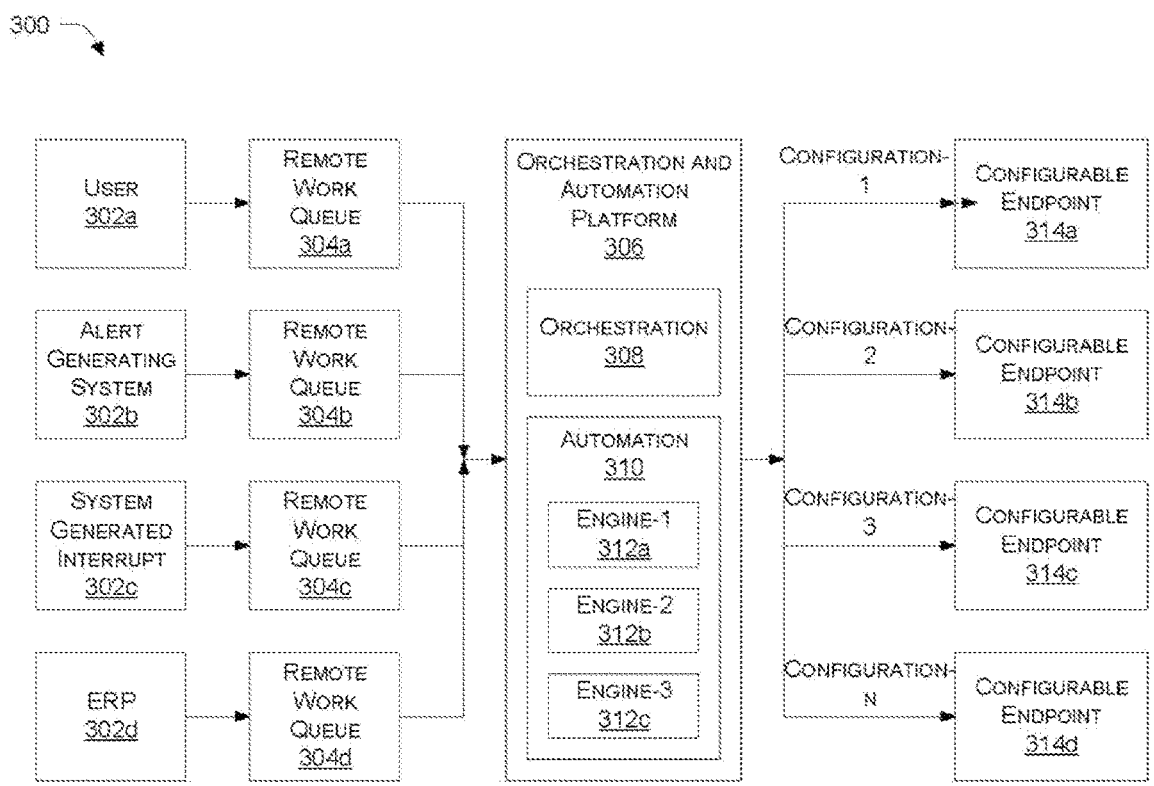
FIG. 3 is a block diagram illustrating publication of a change request to respective remote work queues by a change source, and execution of tasks at respective configurable endpoints under the control of an O&A platform in accordance with one or more embodiments.

Turning to FIG. 3, a block diagram 300 illustrates a process of publishing desired intent in the form of a change request to respective remote work queues 304 by a change source 302, and execution of tasks at respective configurable endpoints 314 under the control of an O&A platform 306. As shown in FIG. 3, change sources 302 (e.g., a user 302a, an alert generating system 302b, a system-generated interrupt 302c, and/or an Enterprise Resource Planning (ERP) system 302d) can publish desired intent by storing a change request embodying the intent to a respective remote work queue 304. Each change source 302 is associated with at least one remote work queue 304 (e.g., remote work queue 304a, remote work queue 304b, remote work queue 304c, and remote work queue 304d) to publish or submit change requests to implement a desired intent. When implemented, the change request causes modifications to one or more configurable endpoints 314 (e.g., a configurable endpoint 314a, a configurable endpoint 314b, a configurable endpoint 314c, and/or a configurable endpoint 314d), but the change request itself (and by implication, the corresponding change source 302) is unaware of configurable endpoints 314 and the specific modifications to be made thereto.

Processing by O&A platform 306 may logically be divided into an orchestration function 308 and one or more automation functions 310. Orchestration function 308 includes processing required for implementing functions of change request receiving module 204, change request classification module 206, task determination module 208, prerequisite processing module 210, and orchestration module 212 each described above in relation to FIG. 2. Orchestration function 308 invokes automation functions 310, which assign group tasks logically to different automation engines (engine-1 312a, engine-2 312b, and engine-3 312c). O&A platform 306 may generate different configurable commands in the target language to be executed on configurable endpoints 314. For example, O&A platform 306 may generate the first set of commands (represented as configuration 1 in FIG. 3) in a language understandable to configurable endpoint 314a, generate a second set of commands (represented as configuration 2 in FIG. 3) in a language understandable to configurable endpoint 314b, generate a third set of commands (represented as configuration 3 in FIG. 3) in a language understandable to configurable endpoint 314c and generate a fourth set of commands (represented as configuration-n in FIG. 3) in a language understandable configurable endpoint 314d.

Figure 4:
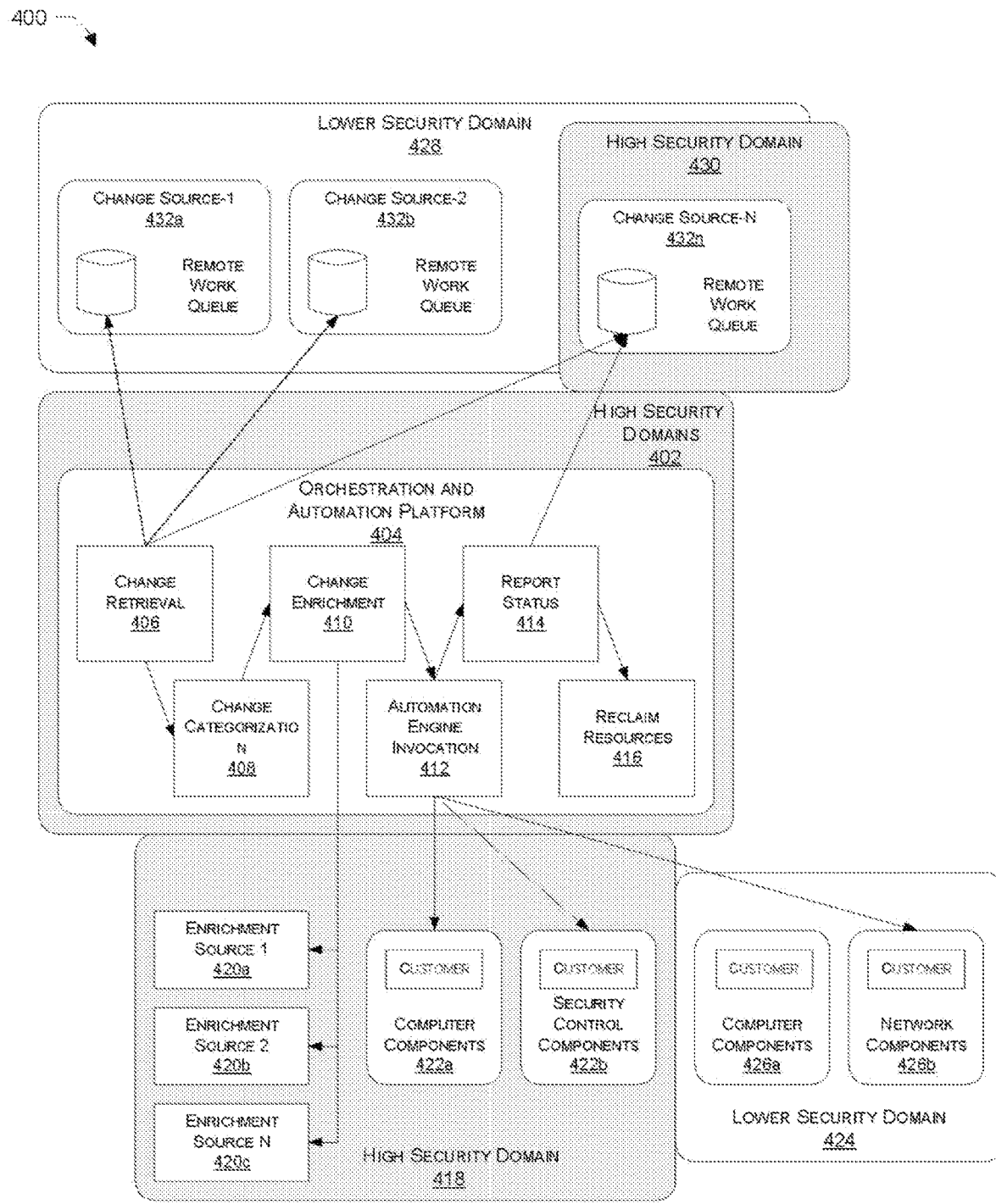
FIG. 4 is a block diagram illustrating a distributed presence of different components of an O&A platform in relation to environments exhibiting differences in, for example, security in accordance with various embodiments.

Turning to FIG. 4, a block diagram 400 illustrates a distributed presence of different components of an O&A platform 404 in environments exhibiting differences in, for example, security. As shown in FIG. 4, an O&A platform 404 (O&A platform 404 may be similar to O&A platform 106 and/or O&A platform 306) may itself be located in a high-security domain 402. One or more change sources 432 (e.g., change source-1 432a, and change source-2 432b) may be located in lower security domains 428, and other change sources 432 (e.g., change source-n 432n) may be located in another high-security domain 430. As shown in FIG. 4, each change source 432 may have its own associated remote work queue to which it may publish a change request. O&A platform 404 performs a change retrieval 406, a change categorization 408, a change enrichment 410, an automation engine invocation 412, a report status 414, and a resource reclamation 416.

O&A platform 404 may reserve or lock resources required for executing one or more tasks associated with a change request retrieved from one of the remote work queues associated with a respective change source 432. Once a resource dependency has cleared, O&A platform 404 releases the previously locked resource. O&A platform 404 may receive a change request for a change to be done on one or more configurable devices located in another high-security domain 418 or in a lower security domain 424. In an embodiment, change retrieval 406 retrieves a change request from one of the remote work queues associated with a respective change source 432, performs change categorization 408 to categorize the change request into one of a number of change classes, performs change enrichment 410 to add missing data point or workflow information for jobs associated with the change class based upon metadata and configuration data included with the change request, and/or completes any prerequisites fundamental to completing the jobs indicated by the change class. To perform the aforementioned change enrichment 410, O&A platform 404 may connect to different enrichment sources 420 (e.g., an enrichment source-1 420a, an enrichment source-2 420b, and an enrichment source-n 420 n) to complete one or more prerequisites and collect enrichment data. O&A platform 404 may use the automaton engines to communicate with and configure targeted endpoints 422 across domains with differing levels of security (e.g., computer components 422a and security control components 422b present in high-security domain 418, and computer components 426*a* and security control component 426*b* present in lower security domain 424). O&A platform 404 may collect status updates from different resources involved in the orchestration and automation function and report the status to change sources.

Figure 5:
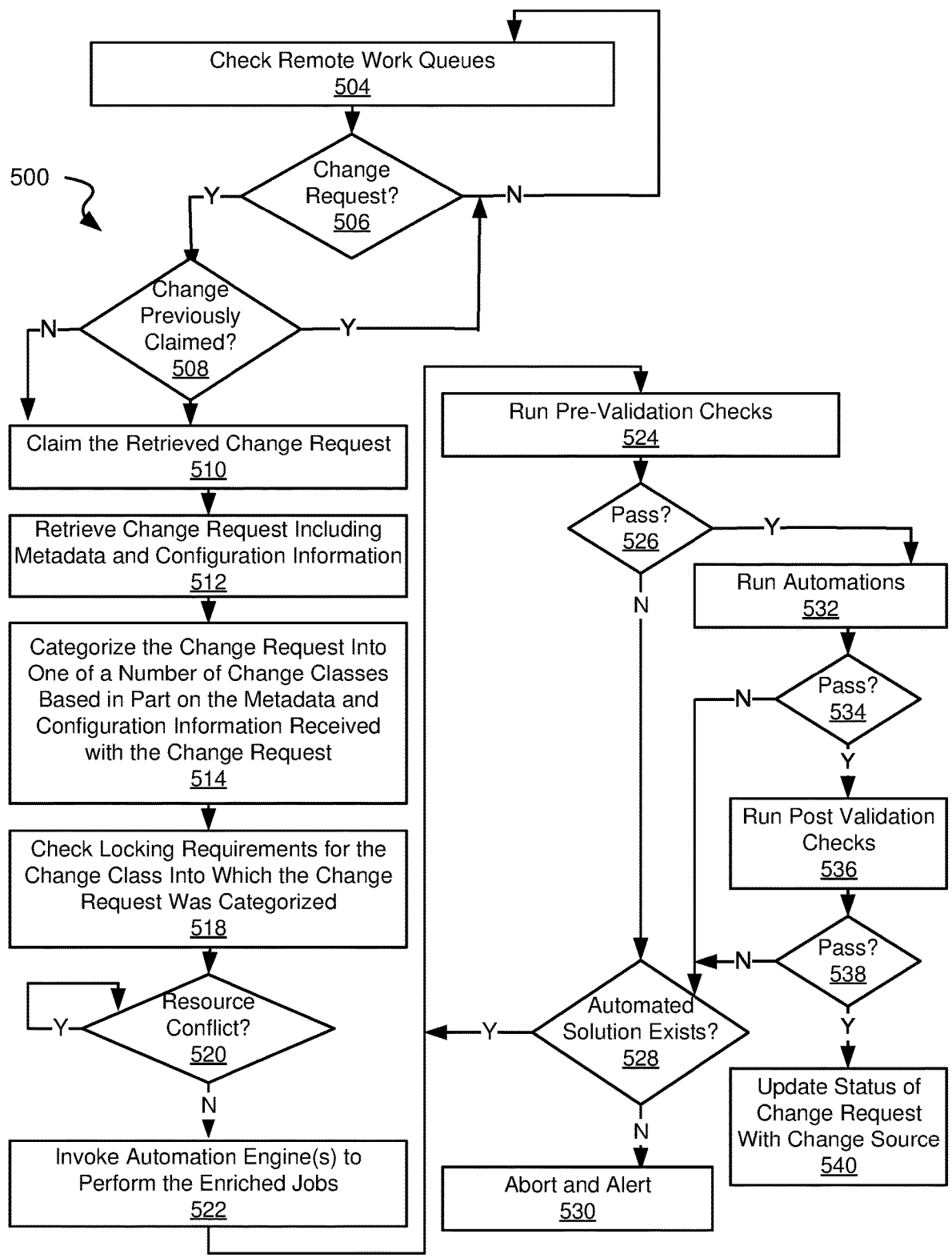
FIG. 5 is a flow diagram illustrating a method enabling endpoint unaware application of secure access service edge in accordance with some embodiments.

Turning to FIG. 5, a flow diagram 500 depicts a method for enabling secure access service edge in accordance with some embodiments. Following flow diagram 500, an O&A system checks remote work queues associated with respective change sources to determine if one or more change requests are waiting in the queues (block 504). The change sources are managed by the O&A system, and each change source utilizes a respective one of the aforementioned remote work queues to indicate an intent to change the state of an SASE system. To indicate an intent to change the O&A system, the change source writes a change request to its remote work queue in a format that is expected. In addition, the change source sets a flag associated with the change request indicating to the O&A system that the change request is "ready to be executed". The O&A system oversees a number of independent processes (occasionally referred to herein as "workers") to execute the changes. These workers access the respective remote work queues looking for change requests to be implemented.

Where a change request is found in one of the checked remote work queues (block 506), the worker of the O&A system determines whether the identified change request was previously claimed by another process (block 508). To ensure that two different workers do not attempt to work on the same change request, before a worker can start working on a given change request it must claim the change request. The worker claims a change request by setting the flag associated with the change request's status from "ready to be executed" to "claimed", and additionally writes an indication of the worker that claimed the change request to the remote work queue. If a previously claimed change request is still in the change source's remote work queue when another worker attempts to claim the previously claimed change request, the requesting worker will receive an error when it attempts to alter the change request's status and worker fields. Where the worker determines that the change request was previously claimed (block 508), the worker ignores the change request and moves on to check the remote work queue for another unclaimed change request or moves on to a remote work queue of another change source.

It should be noted that while the above is described as having individual workers of the O&A system identify previously unclaimed change requests and claim the change requests using flags and other indicators, one of ordinary skill in the art will recognize other approaches for distributing change requests that may be used in relation to different embodiments. For example, the O&A system may utilize a single dedicated process that checks remote work queues for change requests, maintains a record of the status of identified change requests, and assigns the change requests to respective workers for execution.

Alternatively, where an unclaimed change request is found in one of the checked remote work queues (block 508), the worker claims the change request (block 510). As described above, claiming the change request includes setting the flag associated with the change request to change the status of the change request from ready to be executed to "claimed", and additionally writes an indication of the worker that claimed the change request to the remote work queue. Again, this process of claiming can be modified where a single process of the O&A system is employed that maintains a record of change request status and workers re-executing respective change requests.

The worker then retrieves the change request from the remote work queue including any metadata and/or configuration data associated with the change request (block 512). The metadata and configuration data present within the change request may include a variety of information about the systems and/or software applications issuing the change request including, but not limited to, current user profiles. Based upon the disclosure provided herein, one of ordinary skill in the art will recognize a variety of metadata and/or configuration data that may be automatically attached to a change request published by a change source.

The retrieved change request is categorized into one of a number of change classes (block 514). This categorization operates to group the newly retrieved change request into a change class including various types of requests that have, for example, similar jobs and resource locking requirements. Such categorization ensures, for example, that a Customer Configuration Management (CCM) change is not run at the same time that a Life Cycle Management (LCM) is running for the target of the CCM change. Non-limiting examples of change classes include, but are not limited to, an LCM class, a Configuration Management (CM) class, and a CCM class. The LCM class may include system changes (e.g., operating system upgrades to infrastructure associated with the O&A platform) having the potential to impact multiple customers of the O&A platform. The CM class may include system-specific configurations (e.g., initial provisioning of a Firewall as a Service (FWaaS) customer or adding a new virtual private network (VPN) server) having the potential to impact a single customer of the O&A platform. The CCM class may include customer-specific configurations (e.g., internal policy updates to their cloud firewall or endpoint control or changing Web Application Firewall (WAF) domain settings), the impact of which is limited to the customer at issue.

Change classes are metadata that give the O&A system some context for resource conflict resolution. A change request is the total intent to be implemented. Executing the change requests involves performing one or more jobs, and each of the jobs involve performing one or more tasks. Thus, where the change request is the total intent of the change source that is to be implemented, each of the jobs can be described as an atomic set of like tasks to be applied to a configurable endpoint to achieve the specific intent of the change request. The tasks can be described as a single instruction executable on the endpoint to achieve a subset of the specific intent.

In addition to assuring proper resource locking, such categorization of the change request into one of a set of change classes ensures the required details are properly referenced from the correct store, that the jobs are executed in the proper order or in parallel, and the appropriate automation engines are invoked. As such, the change request categorization into a change class intelligently enriches a change source's simplified abstract expression of intent (i.e., the change request) by mapping the expressed intent into a complex grouping of jobs and tasks targeted at one or more endpoints to implement the expressed intent of the change request. This allows users to make complicated network changes without mastery of a broad set of advanced networking, security, and systems topics.

It is then determined whether the resources required to perform the jobs of the particular change class are available (block 518). The O&A system maintains resource requirement indicating which resources are needed by a given job, and dependency logic indicating which jobs must be completed before other jobs, and which jobs have no dependencies and thus can always be performed in parallel. Using the resource requirement and dependency logic, the O&A system performs a resource check to determine if the needed resources are available to implement the set of jobs at issue. Where the resources are not available (block 520), processing of the retrieved change request stalls.

Alternatively, when the resources either are available or become available (block 520), the O&A system locks the resources necessary to complete the jobs and invokes one or more automation engines to perform the enriched jobs (block 522). Each of these automation engines is designed to perform a given job on a particular hardware or software application. As such, the abstraction of the change request having been moved to a concrete set of jobs by categorization, is now rendered specific to particular equipment and/or software applications (i.e., configurable endpoints) operating in relation to the change source that published the original change request. Such automation engines are tools (e.g., saltstack, terraform, puppet, chef, ansible, etc.) that can be used to implement specific intents. For example, terraform is largely optimized for spinning up new cloud resources and although it can also maintain the life cycle configuration management of those resources it's not optimized to do so, like saltstack. In this case, a change that required these two types of operations could invoke the use of two different automation engines with a job and tasks assigned to terraform and a job and tasks assigned to saltstack.

Various pre-validation checks are performed to assure that the jobs performed by the automation engines are within expected and/or allowed parameters (block 524). These pre-validation checks are automated checks designed to assure that tasks to be performed in relation to configurable endpoints are, for example, make only valid changes to configurable endpoints, that the automation engines have the required permissions to make requested changes, and that the automation engines have access to the configurable endpoints. Based upon the disclosure provided herein, one of ordinary skill in the art will recognize a variety of checks that can be performed in relation to various embodiments.

Where the pre-validation checks indicate one or more issues limiting the ability of the automation engines to perform their respective jobs (block 526), it is determined whether an automated solution exists to resolve the limitation (block 528). Failure in prior attempts to perform similar sets of jobs may have resulted in development of workflows that resolve the identified pre-validation check error. In such a situation, the original set of jobs is modified to use the developed workflows (block 528), and the pre-validation checks are performed including making the automated changes (block 524). Alternatively, where an automated solution does not exist (block 528), the process is aborted and an alert is sent indicating a failure to implement the change request (block 530). Alternatively, where an automated solution exists (block 528), the pre-validation checks are performed including making the automated changes (block 524).

Alternatively, where the pre-validation checks indicate that there are no issues limiting the ability of the automation engines to perform their respective jobs (block 526), the jobs are applied by the automation engines to make the various changes on the targeted configurable endpoints (block 532). It is determined whether all of the jobs applied by the automation engines completely properly (block 534). Where the jobs failed to complete properly (block 538), it is determined whether an automated solution exists to resolve the limitation (block 528). Where an automated solution does not exist (block 528), the process is aborted and an alert is sent indicating a failure to implement the change request (block 530). This abort can include, for example, reporting the failure to the change source, the change source removing the change request from its remote work queue, and/or the O&A releasing any previously locked resources. Alternatively, where an automated solution exists (block 528), the pre-validation checks are performed including making the automated changes (block 524).

Alternatively, where the jobs completed properly (block 538), the completed change request is indicated to the change source (block 540). This can include, for example, changing the status flag in the remote work queue from which the change request was retrieved to "done". In addition, all of the resources that were locked to complete the change request are released or unlocked.

In an embodiment, an O&A system may receive the change request in a standardized language, which includes a certain defined format for receiving the change request and related data points. FIG. 6A is an example of a change anatomy 600 that is used in accordance with some embodiments. Change anatomy 600 may include metadata fields, configuration data fields, and status fields. The metadata fields include a unique identifier assigned to a change (UUID) request, change source details (e.g., change source ID, or IP address), type of change being requested, version of the change type, timestamp of the change request and "Not-before" field. The UUID is used as a unique reference for auditing, rollback, associating telemetry data, etc. The change source, type, and version together give orchestration the context it needs to start processing the change request. The unique change source (portal), type (initial FWaaS), and version allows for orchestration to invoke the correct automation engine, proper location(s) to pull data from and invoke the correct permutation with which to interact with the appropriate configurable endpoints. The field "created on" and "non-before" give a non-mutable timestamp so the system knows when the change was created by the change source and the ability to schedule changes for those that should be implemented during a maintenance window or some other coordinated time. These fields allow the system to do things like a phase in new automation engines when appropriate, upgrade existing ones, introduce new code in a controlled manner, all without impact to orchestration's ability to process changes reliably.

The configuration data fields include a field to indicate whether the change request is provided by a sensitive change source or a non-sensitive change source and a field to indicate whether the change request is retrieved from a sensitive change source or a non-sensitive change source. There may be two types of configuration data, such as data that is collected by the change source (both secret and non-secret) and data that is stored anywhere else relative to the change source (secret and non-secret). These fields of configurable data may help illuminate the importance of having a single source of truth for each piece of data. As one may appreciate, this does not imply there must be a single source of truth for all data. To overcome the implication of having a single data type (public IPs allocated for FWaaS), there should be only one place that is referred to as "true." As one may appreciate, the field of change anatomy are representative, and the system envisions addition of other fields for better interoperability and adding new feature/capabilities.

The status fields include fields to indicate query status, status code, and status updated by details. The status fields are used to indicate to an O&A system or platform that a change is ready to be picked up and acted on. It also indicates to the change source that orchestration applied by the O&A system or platform has either erred and cannot proceed or has successfully completed the requested change. Due to the complexity of the platform, orchestrations status codes may be much like those used in, for example, the HTTP protocol, where groups of 100 s are used to indicate major statuses, tens are used for sub-status, and the ones place used for specific sub-statuses. This status code may not be required from the change source when making a change available for orchestration, but can be used to indicate specifics about orchestration's ability to implement the requested change. The fields in a change's status are "updated by" and "updated-at"—this allows the O&A system or platform and change sources to know whether a human had to interact with the O&A system or platform to address an issue and when that interaction occurred. FIG. 6B is an example use case of change anatomy designed in accordance with an embodiment of the present disclosure.

Figures 7, 8:
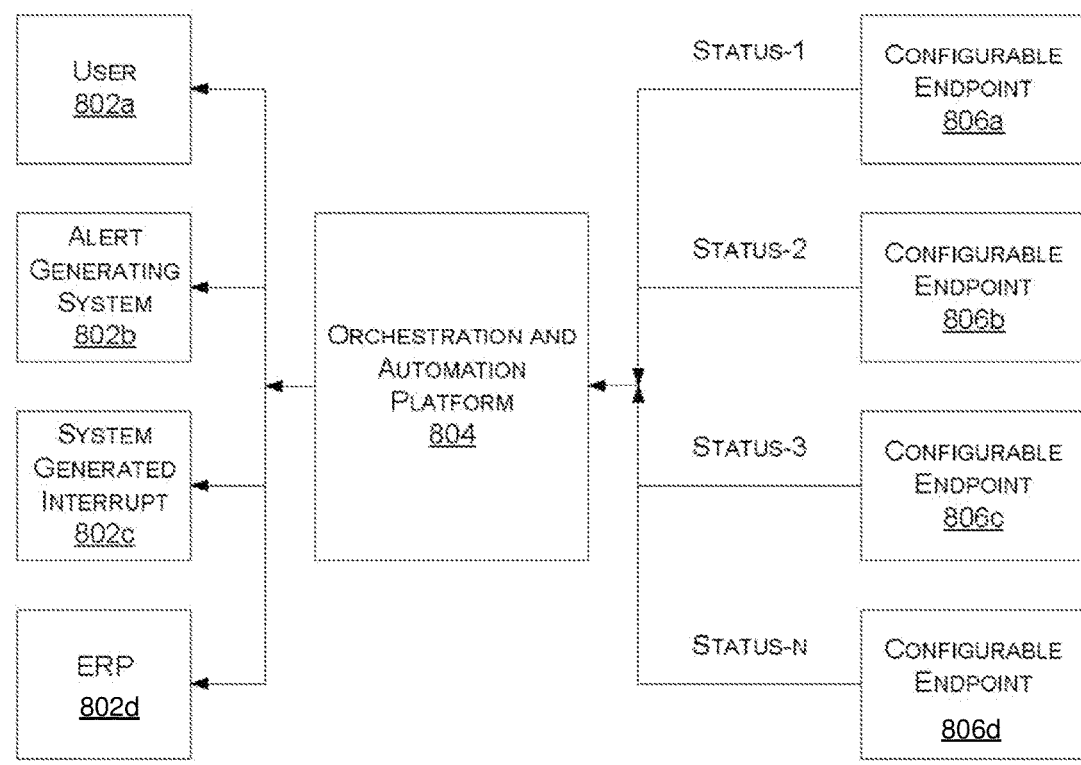
FIG. 7 depicts an example automation engine decision matrix created in accordance with various embodiments.
FIG. 8 is a block diagram illustrating a collection and reporting of status update in accordance with one or more embodiments.

Turning to FIG. 7, an example automation engine decision matrix is shown in accordance with an embodiment. The O&A system, after determining the change type of a change class, may assign the changes of a particular type to one or more automation engines using the decision matrix, which may have been created in advance. As one may appreciate, the example are for illustration purposes only and are not assertions for one automation engine over another for any particular type or class. The O&A system may use a similar mapping of change types and automation engines to invoke appropriate automation engines based on the categorization of a change request. Although mapping of automation engines for different change types are recommended, the system may find an appropriate automation engine based on metadata of the change request and attributes of the target configurable devices. The system may select an automation engine to use for completing a set of task-based on interoperability requirements of orchestration. In an embodiment, the system may identify a candidate automation engine based on change type/class combo. The system may support countless automation engines, much like add countless programming languages to write our code in.

Turning to FIG. 8, a block diagram 800 illustrates the collection and reporting of status update in accordance with some embodiments. As shown in FIG. 8, status updates related to automaton and execution of commands on configurable endpoints 806 (e.g., a configurable endpoint 806a, a configurable endpoint 806b, a configurable endpoint 806c, and a configurable endpoint 806d) are reported back to the change sources 802 (e.g., a user 802a, an alert generating system 802b, a system generated interrupt 802c, and an ERP 802d). An O&A platform 804 may receive status updates from different configurable endpoints 806 regarding the status of each task, entire job, and change request. O&A platform 804 may forward the status update to a change source 802 from which the change request was originally claimed. In an embodiment, the status update reflected through the change status field update of the change anatomy (similar to change anatomy 600).

Figure 9:
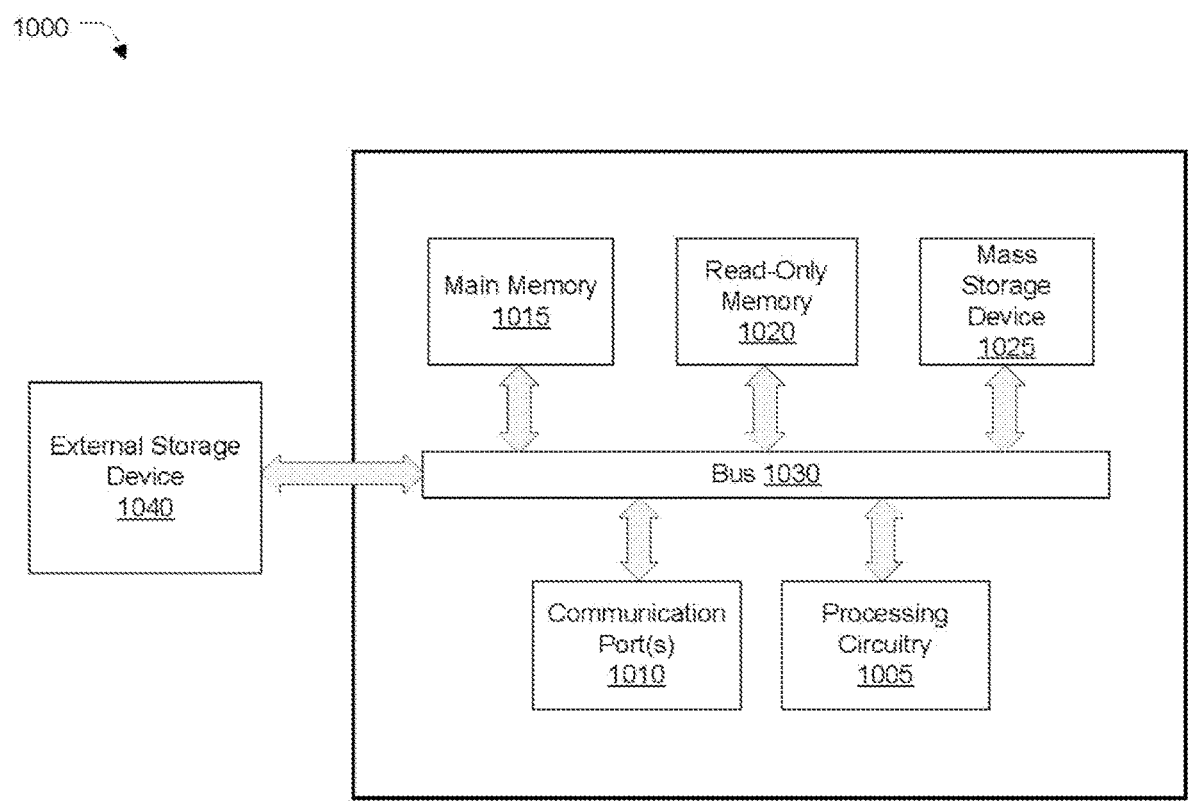
FIG. 9 illustrates an example computer system in which or with which various embodiments may be utilized.

Turning to FIG. 9, an example computer system 1000 is shown that may be used in relation to different embodiments. As shown in FIG. 9, computer system 1000 includes an external storage device 1010, a bus 1020, a main memory 1030, a read-only memory 1040, a mass storage device 1050, a communication port 1060, and a processor 1070.

Those skilled in the art will appreciate that computer system 1000 may include more than one processor 1070 and communication ports 1060. Examples of processor 1070 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 1070 may include various modules associated with some embodiments.

Communication port 1060 can be any of an RS-232 port for use with a modem-based dialup connection, a 10/100 Ethernet port, a Gigabit or 10 Gigabit port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 1030 can be Random Access Memory (RAM) or any other dynamic storage device commonly known in the art. Read-only memory 740 can be any static storage device(s), e.g., but not limited to, a Programmable Read-Only Memory (PROM) chips for storing static information, e.g., start-up or BIOS instructions for processor 770.

Mass storage 1050 may be any current or future mass storage solution, which can be used to store information and/or instructions. Example mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage, and communication blocks. Bus 1020 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1070 to a software system.

Optionally, operator and administrative interfaces, e.g., a display, keyboard, and a cursor control device, may also be coupled to bus 1020 to support direct operator interaction with the computer system. Other operator and administrative interfaces can be provided through network connections connected through communication port 1060. An external storage device 1010 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned example computer system limit the scope of the present disclosure.

As one may appreciate, the systems and methods described above may be configured to receiving an abstract intent and change request in a unified language and orchestrate and automate changes required to be done of any computing devices or computing resources. The examples listed here relates to network and network security. However, the system invasions integration of any number of automation engines, which can facilitate translation of change requests received in one standardized language and execute commands on different computing devices, irrespective of the vendor, location, and network restriction.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for orchestrating intent in a network environment, the method comprising:
   retrieving a change request, by an orchestration and automation (O&A) platform that facilitates deployment, provisioning, configuration, and management of a plurality of configurable endpoints, from a remote work queue, wherein the change request includes an abstract expression of intent regarding a change desired by a change source without specifying jobs or tasks required for carrying out the change, wherein the change request is not specific to any particular configurable endpoint of the plurality of configurable endpoints, and wherein at least one of the plurality of configurable endpoints comprises a Secure Access Service Edge (SASE) platform;
   categorizing, by the O&A platform, the change request into a particular change class, wherein the particular change class is one of a plurality of change classes, and wherein the particular change class indicates one or more jobs to be performed to effectuate the change request;
   assigning at least one automation engine to perform one or more tasks to complete the one or more jobs, wherein the one or more tasks are specific to one or more configurable endpoints of the plurality of configurable endpoints; and
   performing the one or more tasks to modify the one or more configurable endpoints consistent with the change request.

2. The method of claim 1, wherein the at least one automation engine includes a first automation engine and a second automation engine, wherein the one or more configurable endpoints includes a first configurable endpoint and a second configurable endpoint, wherein the one or more jobs includes a first job and a second job, wherein the one or more tasks includes a first task associated with the first job and a second task associated with the second job, and wherein performing the one or more tasks to modify the one or more configurable endpoints comprises:
   determining a prerequisite for completing the first job and the second job;
   orchestrating performance of the first job and the second job based at least in part on the prerequisite including:
   when the prerequisite is capable of being satisfied:
   causing the first automation engine to execute the first task to configure the first configurable endpoint; and
   causing the second automation engine to execute the second task to configure the second configurable endpoint.

3. The method of claim 2, wherein the orchestrating includes scheduling the first job and the second job to be performed serially.

4. The method of claim 2, wherein the orchestrating includes scheduling the first job and the second job to be performed in parallel.

5. The method of claim 2, the method further comprising:
   when the prerequisite is incapable of being satisfied:
   identifying an automated solution to cure a defect in one or more of the first job, the second job, the first endpoint, or the second endpoint; and
   re-determining the prerequisite for completing the first job and the second job.

6. The method of claim 1, wherein the one or more configurable endpoints includes a first configurable endpoint and a second configurable endpoint, wherein the two or more jobs includes a first job and a second job, wherein the one or more tasks includes a first task and a second task associated with the first job, and a third task and a fourth task associated with the second job, and wherein the method further comprises:
   dynamically translating the first job into at least the first task and the second task, wherein at least one of the first task and the second task is a configuration command to be issued to the first configurable endpoint; and
   dynamically translating the second job into at least the third task and the fourth task, wherein at least one of the third task and the fourth task is a configuration command to be issued to the second configurable endpoint.

7. The method of claim 1, wherein the change request includes an appended data element; wherein categorizing the change request into the particular change class is based at least in part on the appended data element, and wherein the appended data element is automatically associated with the change request without input from the change source.

8. The method of claim 7, wherein the appended data element includes metadata and configuration data.

9. The method of claim 1, wherein the change source is selected from a group consisting of: a human user, an alert generating system, a system generated interrupt, and an enterprise resource planning system.

10. The method of claim 1, wherein the change source is one of a plurality of change sources, wherein the remote work queue is one of a plurality of remote work queues, wherein each of the plurality of remote work queues is associated with a respective one of the plurality of change sources, and wherein the retrieving includes checking each of the plurality of remote work queues.

11. The method of claim 1, the method further comprising:
   receiving information regarding a completion status of the one or more jobs; and
   reporting a completion status of the change request to the change source.

12. A cloud-delivered orchestration and automation (O&A) system comprising:
   at least one processor;
   a memory, wherein the memory includes instructions executable by the at least one processor to:
   retrieve a change request from a remote work queue, wherein the change request includes an abstract expression of intent regarding a change desired by a change source relating to one or more configurable endpoints of a plurality of configurable endpoints for which the cloud-delivered O&A system facilitates deployment, provisioning, configuration, and management, wherein the change request does not specify jobs or tasks required for carrying out the change and is not specific to any particular configurable endpoint, and wherein at least one of the plurality of configurable endpoints comprises a Secure Access Service Edge (SASE) platform;

categorize the change request into a particular change class, wherein the particular change class is one of a plurality of change classes, and wherein the particular change class indicates one or more jobs to be performed to effectuate the change request;

assign at least one automation engine to perform one or more tasks to complete the two or more jobs, wherein the one or more tasks are specific to one or more configurable endpoints; and perform the one or more tasks to modify the one or more configurable endpoints consistent with the change request.

13. The cloud-delivered O&A system of claim 12, wherein the change source is selected from a group consisting of: a human user, an alert generating system, a system generated interrupt, and an enterprise resource planning system.

14. The cloud-delivered O&A system of claim 12, wherein the change source is one of a plurality of change sources, wherein the remote work queue is one of a plurality of remote work queues, wherein each of the plurality of remote work queues is associated with a respective one of the plurality of change sources, and wherein the retrieving includes checking each of the plurality of remote work queues.

15. The cloud-delivered O&A system of claim 12, wherein the memory further includes instructions executable by the at least one processor to:

receive information regarding a completion status of the one or more jobs; and report a completion status of the change request to the change source.

16. The cloud-delivered O&A system of claim 12, wherein at least one of the one or more configurable endpoints is selected from a group consisting of: a network device, a network security device, and a cloud based service.

17. A non-transitory computer-readable storage medium embodying a set of instructions, which when executed by one or more processing resources of a cloud-delivered O&A platform, causes the cloud-delivered O&A platform to perform a method comprising:

retrieving a change request from a remote work queue, wherein the change request includes an abstract expression of intent regarding a change desired by a change source relating to one or more configurable endpoints of a plurality of configurable endpoints for which the cloud-delivered O&A platform facilitates deployment, provisioning, configuration, and management, wherein the change request does not specify jobs or tasks required for carrying out the change and is not specific to any particular configurable endpoint, and wherein at least one of the plurality of configurable endpoints comprises a Secure Access Service Edge (SASE) platform;

categorizing, by the O&A platform, the change request into a particular change class, wherein the particular change class is one of a plurality of change classes, and wherein the particular change class indicates one or more jobs to be performed to effectuate the change request;

assigning at least one automation engine to perform one or more tasks to complete the one or more jobs, wherein the one or more tasks are specific to one or more configurable endpoints of the plurality of configurable endpoints; and performing the one or more tasks to modify the one or more configurable endpoints consistent with the change request.

18. The non-transitory computer-readable storage medium of claim 17, wherein the at least one automation engine includes a first automation engine and a second automation engine, wherein the one or more configurable endpoints includes a first configurable endpoint and a second configurable endpoint, wherein the one or more jobs includes a first job and a second job, wherein the one or more tasks includes a first task associated with the first job and a second task associated with the second job, and wherein performing the one or more tasks to modify the one or more configurable endpoints comprises:

determining a prerequisite for completing the first job and the second job;

orchestrating performance of the first job and the second job based at least in part on the prerequisite including:

when the prerequisite is capable of being satisfied:

causing the first automation engine to execute the first task to configure the first configurable endpoint; and causing the second automation engine to execute the second task to configure the second configurable endpoint.

19. The non-transitory computer-readable storage medium of claim 18, wherein the orchestrating includes scheduling the first job and the second job to be performed serially.

20. The non-transitory computer-readable storage medium of claim 18, wherein the orchestrating includes scheduling the first job and the second job to be performed in parallel.

* * * * *